US012633714B2

(12) United States Patent
Iguchi et al.

(10) Patent No.: US 12,633,714 B2
(45) Date of Patent: May 19, 2026

(54) LASER DEVICE, AND METHOD FOR MANUFACTURING LASER DEVICE

(71) Applicant: HAMAMATSU PHOTONICS K.K., Hamamatsu (JP)

(72) Inventors: Takuto Iguchi, Hamamatsu (JP); Yoshinori Kato, Hamamatsu (JP); Takaaki Morita, Hamamatsu (JP); Kazuki Kawai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 562 days.

(21) Appl. No.: 18/022,841

(22) PCT Filed: Aug. 19, 2021

(86) PCT No.: PCT/JP2021/030435
§ 371 (c)(1),
(2) Date: Feb. 23, 2023

(87) PCT Pub. No.: WO2022/050072
PCT Pub. Date: Mar. 10, 2022

(65) Prior Publication Data
US 2023/0335965 A1 Oct. 19, 2023

(30) Foreign Application Priority Data

Sep. 4, 2020 (JP) ................................ 2020-148902

(51) Int. Cl.
*H01S 3/02* (2006.01)
*H01S 3/04* (2006.01)
(Continued)

(52) U.S. Cl.
CPC ............ *H01S 3/025* (2013.01); *H01S 3/0407* (2013.01); *H01S 3/042* (2013.01); *H01S 3/061* (2013.01); *H01S 3/0941* (2013.01)

(58) Field of Classification Search
CPC ........ H01S 3/025; H01S 3/0941; H01S 3/042; H01S 3/0405; H01S 3/00407; H01S 3/027
See application file for complete search history.

(56) References Cited

U.S. PATENT DOCUMENTS 5,251,369 A 10/1993 August, Jr. et al.
5,278,860 A 1/1994 August, Jr. et al.
(Continued)

FOREIGN PATENT DOCUMENTS

CN 109967884 A 7/2019
JP H5-335662 A 12/1993
(Continued)

OTHER PUBLICATIONS

English-language translation of International Preliminary Report on Patentability (IPRP) dated Mar. 16, 2023 that issued in WO Patent Application No. PCT/JP2021/030435.

*Primary Examiner* — Tod T Van Roy
*Assistant Examiner* — Delma R Forde
(74) *Attorney, Agent, or Firm* — Faegre Drinker Biddle & Reath LLP

(57) ABSTRACT

Disclosed is a laser device including: a rod-shaped laser medium extending in a first direction; a first light source unit including a first base having a first notch through which the laser medium passes and a plurality of excitation light sources attached to the first base; and a holder supporting the laser medium and the first light source unit. At least one of the first base and the holder includes a first regulating part configured to regulate a position of the first base with respect to the holder.

11 Claims, 9 Drawing Sheets

(51) Int. Cl.
    *H01S 3/042*     (2006.01)
    *H01S 3/06*     (2006.01)
    *H01S 3/0941*     (2006.01)

(56)         References Cited

U.S. PATENT DOCUMENTS

| | | | |
|---|---|---|---|
| 5,317,590 A | | 5/1994 | August, Jr. et al. |
| 5,619,522 A | * | 4/1997 | Dube .................... H01S 3/0941 |
| | | | 372/92 |
| 5,661,738 A | | 8/1997 | Yasui et al. |
| 5,883,737 A | * | 3/1999 | Fujikawa .............. H01S 3/0941 |
| | | | 372/75 |
| 6,075,803 A | | 6/2000 | Bull et al. |
| 6,473,444 B1 | | 10/2002 | Deschaseaux |
| 7,796,670 B1 | * | 9/2010 | Fujikawa .............. H01S 3/0941 |
| | | | 372/75 |
| 2004/0136430 A1 | * | 7/2004 | Tsunekane .............. H01S 3/025 |
| | | | 372/70 |
| 2005/0129080 A1 | | 6/2005 | Massmann et al. |
| 2010/0195679 A1 | | 8/2010 | Kroupa et al. |
| 2012/0177073 A1 | | 7/2012 | Stephens, IV et al. |

FOREIGN PATENT DOCUMENTS

| | | | | |
|---|---|---|---|---|
| JP | H7-122804 A | | 5/1995 | |
| JP | H07122804 | * | 5/1995 | ............. H01S 3/094 |
| JP | H9-260754 A | | 10/1997 | |
| JP | H10-275952 A | | 10/1998 | |
| JP | 2000-277837 A | | 10/2000 | |
| JP | 2005-285807 A | | 10/2005 | |
| JP | 2008-021879 A | | 1/2008 | |
| JP | 2015-119012 A | | 6/2015 | |
| JP | 2022-043569 A | | 3/2022 | |
| WO | WO-2012/137259 A1 | | 10/2012 | |

* cited by examiner (a)

(b)

(c)

LASER DEVICE, AND METHOD FOR MANUFACTURING LASER DEVICE

TECHNICAL FIELD

The present disclosure relates to a laser device and a method for manufacturing a laser device.

BACKGROUND ART

A laser device that includes a rod-shaped laser medium and a plurality of excitation light sources that emit excitation light for exciting the laser medium is known (see Patent Literature 1, for example).

CITATION LIST

Patent Literature

[Patent Literature 1] Japanese Unexamined Patent Publication No. 2005-285807

SUMMARY OF INVENTION

Technical Problem

A laser device like that described above may be configured such that each excitation light source can be attached to and detached from the laser device in a state where the laser device is installed in a laser system. In such a configuration, in a case where each excitation light source is replaced, it is necessary to severely adjust a position and an orientation of each excitation light source with respect to a laser medium such that an excitation distribution in the laser medium is in a desired state. On the other hand, a laser device like that described above may be configured such that the entire light device can be attached to and detached from the laser system. In such a configuration, in a case where each excitation light source is replaced, it is necessary to severely adjust a position and an orientation of the laser device in the laser system such that an optical axis of a laser medium is aligned with an optical axis of the laser system.

An object of the present disclosure is to provide a laser device capable of facilitating attachment and detachment of a plurality of excitation light sources and facilitating positioning of the plurality of excitation light sources and a method of manufacturing such a laser device.

Solution to Problem

According to an aspect of the present disclosure, there is provided a laser device including: a rod-shaped laser medium extending in a first direction; a first light source unit including a first base having a first notch through which the laser medium passes and a plurality of excitation light sources attached to the first base; and a holder supporting the laser medium and the first light source unit, wherein at least one of the first base and the holder includes a first regulating part configured to regulate a position of the first base with respect to the holder.

In this laser device, the first base and the plurality of excitation light sources are unitized as the first light source unit, and the first light source unit is supported by the holder. As a result, the plurality of excitation light sources can be easily attached to and detached from the holder by simply attaching and detaching the first base to and from the holder. Furthermore, when the first base is attached to the holder supporting the laser medium, the laser medium passes through the first notch of the first base, and the position of the first base with respect to the holder is regulated by the first regulating part. As a result, the plurality of excitation light sources can be easily positioned with respect to the laser medium by simply attaching the first base to the holder supporting the laser medium. As described above, according to this laser device, it is possible to facilitate the attachment and detachment of the plurality of excitation light sources and to facilitate the positioning of the plurality of excitation light sources.

The laser device according to the aspect of the present disclosure may further include: a second light source unit arranged side by side with the first light source unit in the first direction, the second light source unit including a second base having a second notch through which the laser medium passes and a plurality of excitation light sources attached to the second base, wherein the holder may support the second light source unit, and at least one of the second base and the holder may include a second regulating part configured to regulate a position of the second base with respect to the holder. According to this configuration, the plurality of excitation light sources can be easily attached to and detached from the holder by simply attaching and detaching the second base to and from the holder. In addition, the plurality of excitation light sources can be easily positioned with respect to the laser medium by simply attaching the second base to the holder supporting the laser medium.

In the laser device according to the aspect of the present disclosure, the holder may include a first holding member and a second holding member arranged side by side in the first direction and a connecting member connecting the first holding member and the second holding member to each other, and the first light source unit and the second light source unit may be disposed between the first holding member and the second holding member. According to this configuration, the size of the laser device can be reduced and the structure can be simplified.

In the laser device according to the aspect of the present disclosure, the first holding member may include a first protrusion disposed in the first notch as the first regulating part, and the first protrusion may have a support surface supporting the first base rotatably in a circumferential direction centered on a center line of the laser medium. According to this configuration, the positions of the plurality of excitation light sources of the first light source unit can be adjusted in the circumferential direction centered on the center line of the laser medium.

In the laser device according to the aspect of the present disclosure, the second holding member may include a second protrusion disposed in the second notch as the second regulating part, and the second protrusion may have a support surface supporting the second base rotatably in the circumferential direction. As a result, the positions of the plurality of excitation light sources of the second light source unit can be adjusted in the circumferential direction centered on the center line of the laser medium.

In the laser device according to the aspect of the present disclosure, the holder may further include a partition member attached to the connecting member between the first holding member and the second holding member, and the partition member may include a first stopper configured to restrict rotation of the first base in the circumferential direction as the first regulating part and may include a second stopper configured to restrict rotation of the second base in the circumferential direction as the second regulating part. According to this configuration, the plurality of excitation light sources can be easily and reliably positioned with respect to the laser medium by bringing the first base and the second base into contact with the first stopper and the second stopper of the partition member, respectively.

In the laser device according to the aspect of the present disclosure, the partition member may be made of an insulation material. According to this configuration, it is possible to reliably prevent short circuits between the plurality of excitation light sources of the first light source unit and the plurality of excitation light sources of the second light source unit.

In the laser device according to the aspect of the present disclosure, at least one of the plurality of excitation light sources attached to the first base may overlap the second notch when viewed in the first direction, and at least one of the plurality of excitation light sources attached to the second base may overlap the first notch when viewed in the first direction. According to this configuration, an excitation distribution in the laser medium can be made uniform.

In the laser device according to the aspect of the present disclosure, the first base may include a first flow path through which a coolant flows, the second base may include a second flow path through which a coolant flows, and the holder may include a third flow path through which a coolant flows. According to this configuration, the laser medium and the plurality of excitation light sources can be cooled.

In the laser device according to the aspect of the present disclosure, the first flow path, the second flow path, and the third flow path may communicate with each other. According to this configuration, the laser medium and the plurality of excitation light sources can be efficiently cooled.

In the laser device according to the aspect of the present disclosure, the holder may include a tubular body in which the laser medium is disposed, the tubular body may have light transmittance, the third flow path may include a main flow path including a flow path between the laser medium and the tubular body, a first branch flow path and a second branch flow path branching from the main flow path, and a third branch flow path and a fourth branch flow path joining the main flow path, a downstream end of the first branch flow path may be connected to an upstream end of the first flow path, a downstream end of the second branch flow path may be connected to an upstream end of the second flow path, an upstream end of the third branch flow path may be connected to the downstream end of the first flow path, and an upstream end of the fourth branch flow path may be connected to the downstream end of the second flow path. According to this configuration, the laser medium and the plurality of excitation light sources can be efficiently cooled with a simple flow path configuration.

In the laser device according to the aspect of the present disclosure, each of the plurality of excitation light sources may include a semiconductor laser element. According to this configuration, the lifetime of each of the excitation light sources can be extended. In addition, since the plurality of excitation light sources are unitized as the first light source unit or the second light source unit, delicacy required for handling an individual item of the semiconductor laser element is not necessary.

In the laser device according to the aspect of the present disclosure, the semiconductor laser element may include a plurality of stacked semiconductor laser bars. According to this configuration, the laser medium can be efficiently and sufficiently excited.

The laser device according to the aspect of the present disclosure may further include: a second light source unit arranged side by side with the first light source unit in the first direction, the second light source unit including a second base having a second notch through which the laser medium passes and a plurality of excitation light sources attached to the second base, wherein the holder may support the second light source unit, and at least one of the first base and the second base may include a second regulating part configured to regulate a position of the second base with respect to the first base. According to this configuration, the plurality of excitation light sources can be easily attached to and detached from the holder by simply attaching and detaching the second base to and from the holder. In addition, the plurality of excitation light sources can be easily positioned with respect to the laser medium by simply attaching the second base to the holder supporting the laser medium.

According to another aspect of the present disclosure, there is provided a method for manufacturing a laser device, including: a step of preparing a first light source unit including a first base having a first notch and a plurality of excitation light sources attached to the first base; a step of disposing the first base on a holder supporting a rod-shaped laser medium extending in a first direction from one side in a second direction intersecting with the first direction while the laser medium is passed through the first notch in the holder; and a step of rotating the first base to one side in a circumferential direction centered on a center line of the laser medium.

In this method for manufacturing a laser device, the plurality of excitation light sources of the first light source unit can be easily positioned with respect to the laser medium by simply disposing the first base on the holder from one side in the second direction intersecting with the first direction while the rod-shaped laser medium extending in the first direction is passed through the first notch and rotating the first base in the circumferential direction centered on the center line of the laser medium. Therefore, according to this method for manufacturing the laser device, the laser device in which the plurality of excitation light sources are positioned with respect to the laser medium can be easily obtained.

The method for manufacturing a laser device according to the aspect of the present disclosure may further include: a step of preparing a second light source unit including a second base having a second notch and a plurality of excitation light sources attached to the second base; and a step of disposing the second base on the holder from the one side in the second direction while the laser medium is passed through the second notch to arrange the first light source unit and the second light source unit side by side in the first direction. According to this configuration, the plurality of excitation light sources of the second light source unit can be easily positioned with respect to the laser medium by simply disposing the second base on the holder from one side in the second direction intersecting with the first direction while the rod-shaped laser medium extending in the first direction is passed through the second notch.

The method for manufacturing a laser device according to the aspect of the present disclosure may further include: a step of rotating the second base to the other side in a circumferential direction centered on a center line of the laser medium in the step in which the first light source unit and the second light source unit are arranged side by side. According to this configuration, the plurality of excitation light sources of the second light source unit can be easily positioned with respect to the laser medium by simply rotating the second base in the circumferential direction centered on the center line of the laser medium.

Advantageous Effects of Invention

According to the present disclosure, it is possible to provide a laser device capable of facilitating attachment and detachment of a plurality of excitation light sources and facilitating positioning of the plurality of excitation light sources and a method of manufacturing such a laser device.

DESCRIPTION OF EMBODIMENTS

Figure 1:
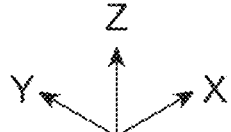
FIG. 1 is a perspective view of a laser device according to an embodiment.

Hereinafter, an embodiment of the present disclosure will be described in detail with reference to the drawings. The same or corresponding parts in the drawings are denoted with the same reference signs, and repetitive description will be omitted.

Figure 2:
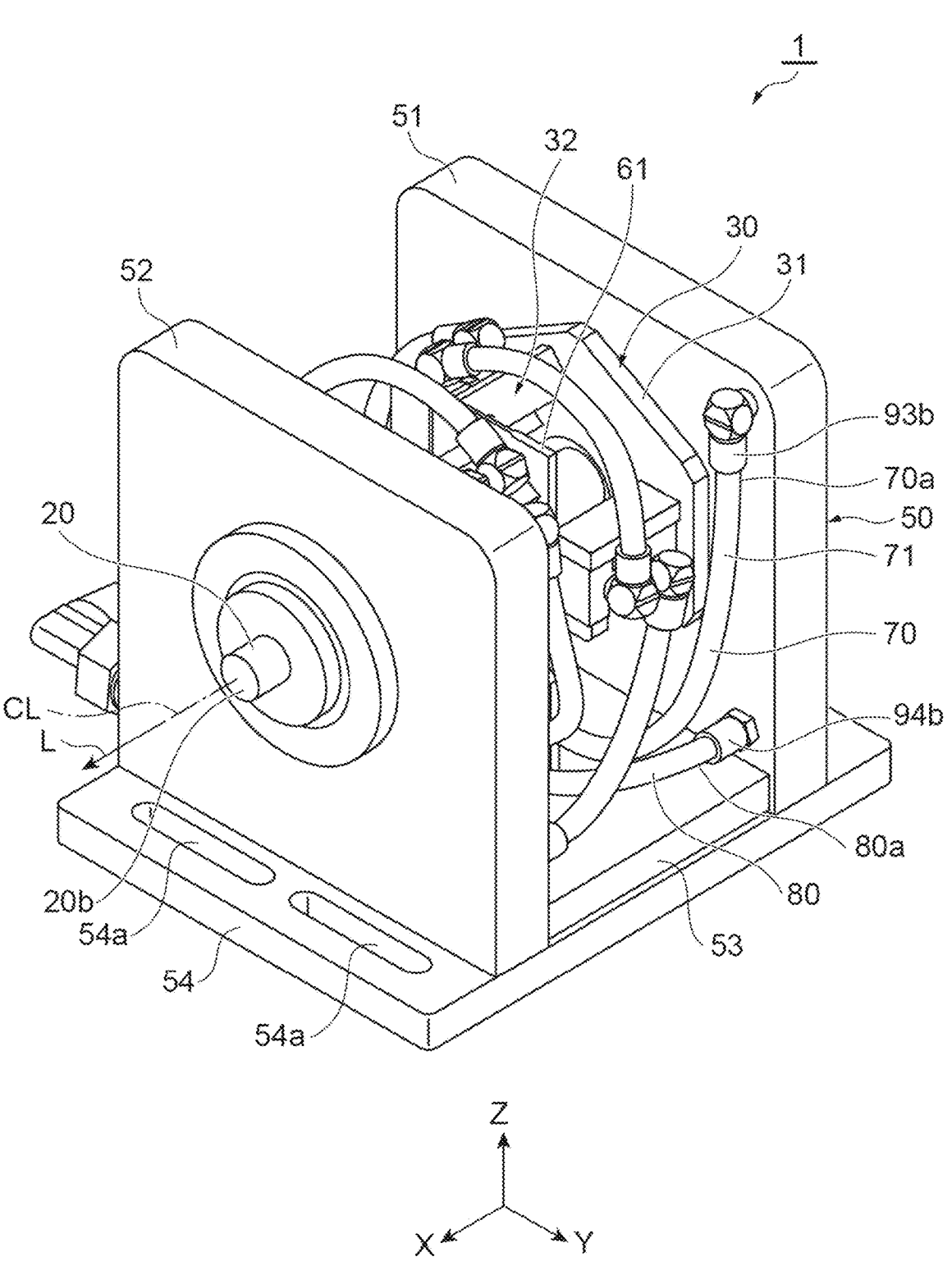
FIG. 2 is a perspective view of the laser device shown in FIG. 1 from another angle.
Figure 3:
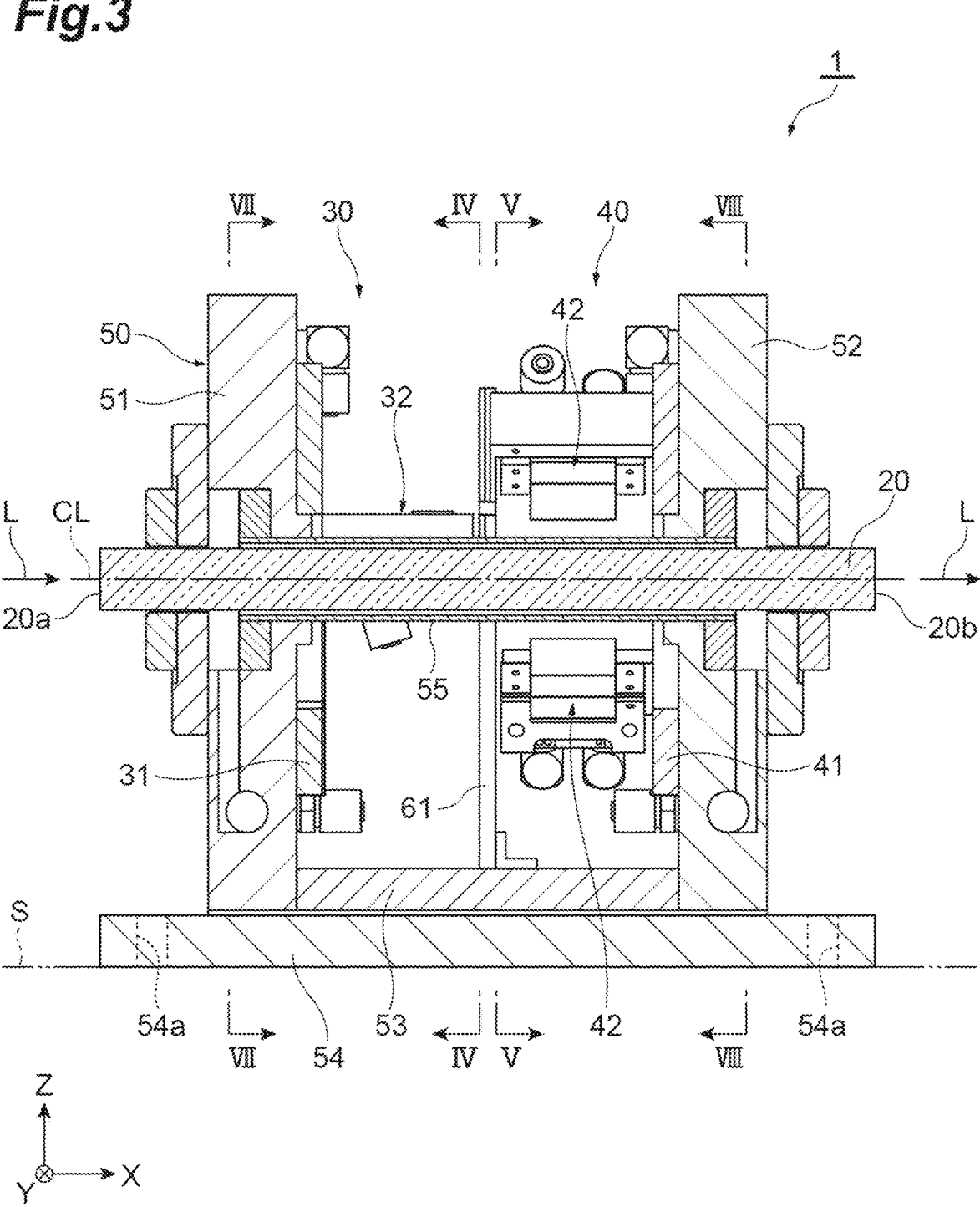
FIG. 3 is a cross-sectional view of the laser device shown in FIG. 1.

As shown in FIGS. 1, 2, and 3, the laser device 1 includes a laser medium 20, a first light source unit 30, a second light source unit 40, and a holder 50. The laser medium 20, the first light source unit 30, and the second light source unit 40 are supported by the holder 50. As an example, the laser device 1 is used as a laser amplifier that amplifies laser light L in a laser system. Hereinafter, a direction in which the laser light L is incident on the laser device 1 is referred to as an X direction, a direction perpendicular to the X direction is referred to as a Y direction, and a direction perpendicular to both the X direction and the Y direction is referred to as a Z direction.

The laser medium 20 is a rod-shaped solid-state laser medium extending in the X direction (a first direction). The laser medium 20 has a center line CL parallel to the X direction. A shape of the laser medium 20 is, for example, a circular column shape having a diameter of approximately 10 mm and a length of approximately 200 mm. A material of the laser medium 20 is Nd:YAG, for example.

The first light source unit 30 and the second light source unit 40 are arranged side by side in the X direction. The first light source unit 30 is disposed on one side in the X direction with respect to the second light source unit 40. In other words, the second light source unit 40 is disposed on the other side in the X direction with respect to the first light source unit 30. The first light source unit 30 includes a first base 31 and a plurality of excitation light sources 32. The plurality of excitation light sources 32 are attached to the first base 31. The second light source unit 40 includes a second base 41 and a plurality of excitation light sources 42. The plurality of excitation light sources 42 are attached to the second base 41.

Figure 4:
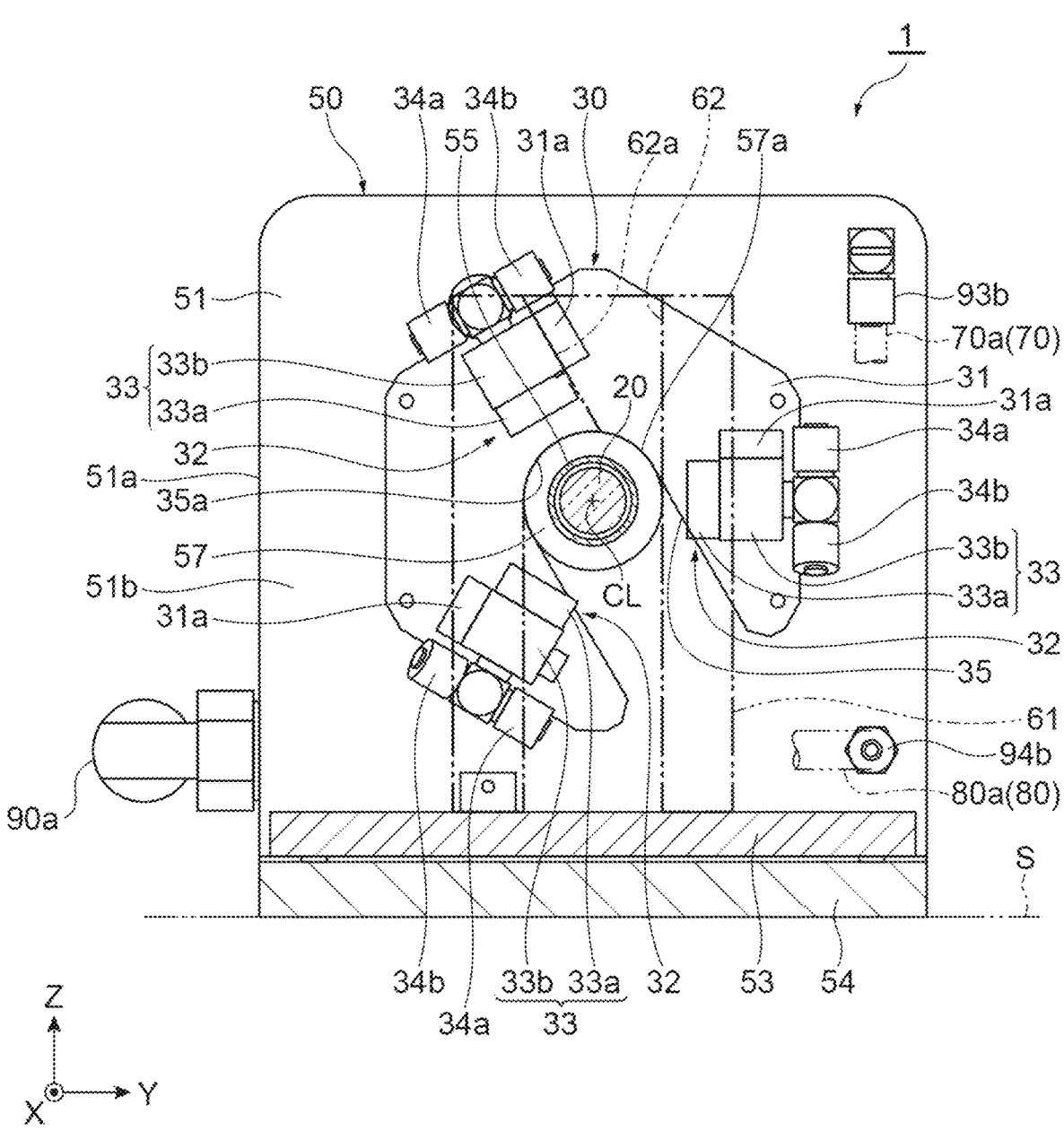
FIG. 4 is a cross-sectional view of the laser device along line IV-IV shown in FIG. 3.
Figure 5:
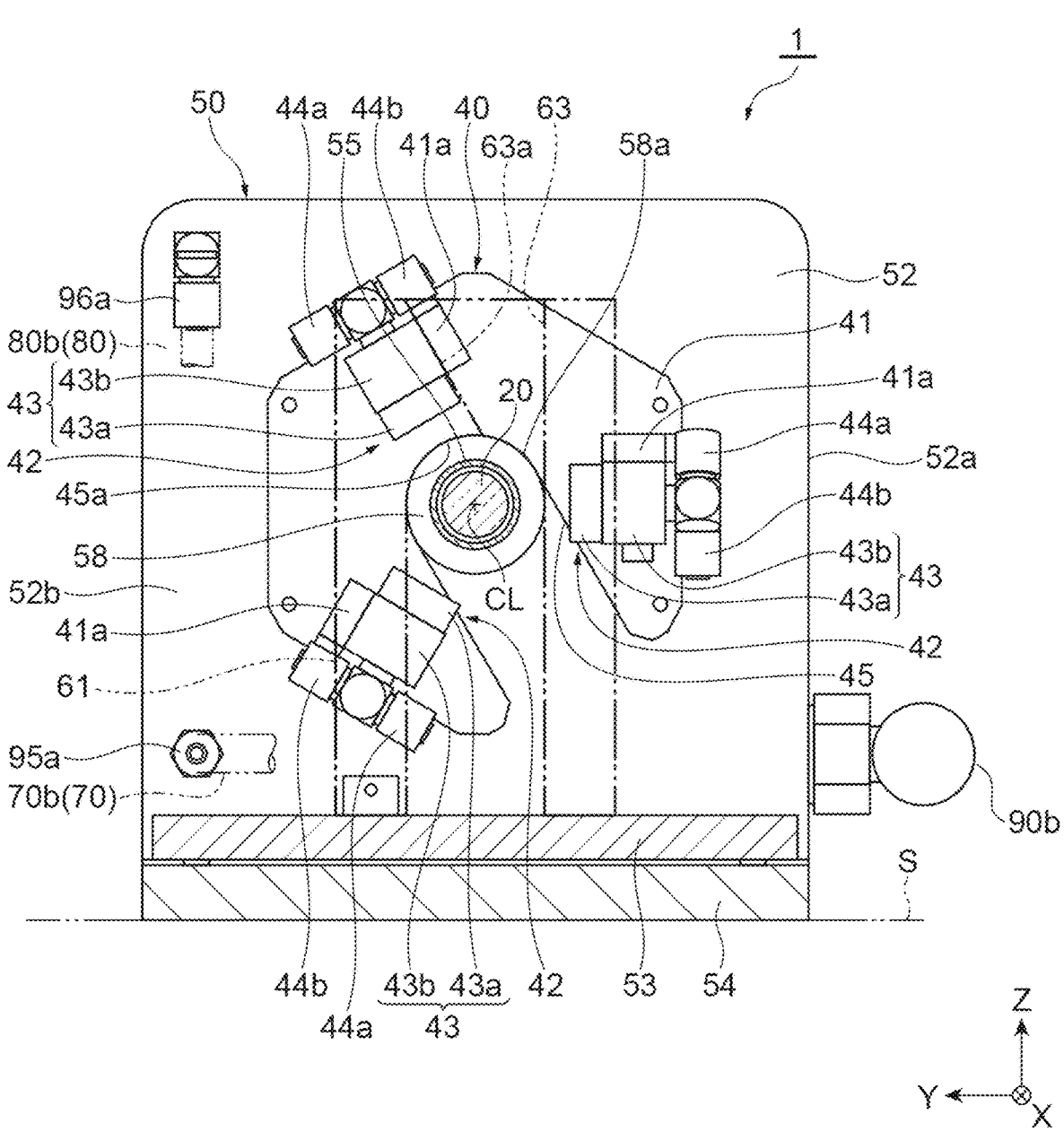
FIG. 5 is a cross-sectional view of the laser device along line V-V shown in FIG. 3.

Each of the first base 31 and the second base 41 is a plate-shaped member whose thickness direction is the X direction. As shown in FIG. 4, the first base 31 has a first notch 35 through which the laser medium 20 passes. A plurality of attachment portions 31a are provided on a surface of the first base 31 on a side of the second base 41 (see FIG. 3). Each excitation light source 32 is attached to one of the attachment portions 31a. As shown in FIG. 5, the second base 41 has a second notch 45 through which the laser medium 20 passes. A plurality of attachment portions 41a are provided on a surface of the second base 41 on a side of the first base 31 (see FIG. 3). Each excitation light source 42 is attached to one of the attachment portions 41a. A material of each of the first base 31 and the second base 41 is, for example, aluminum.

Figure 6:
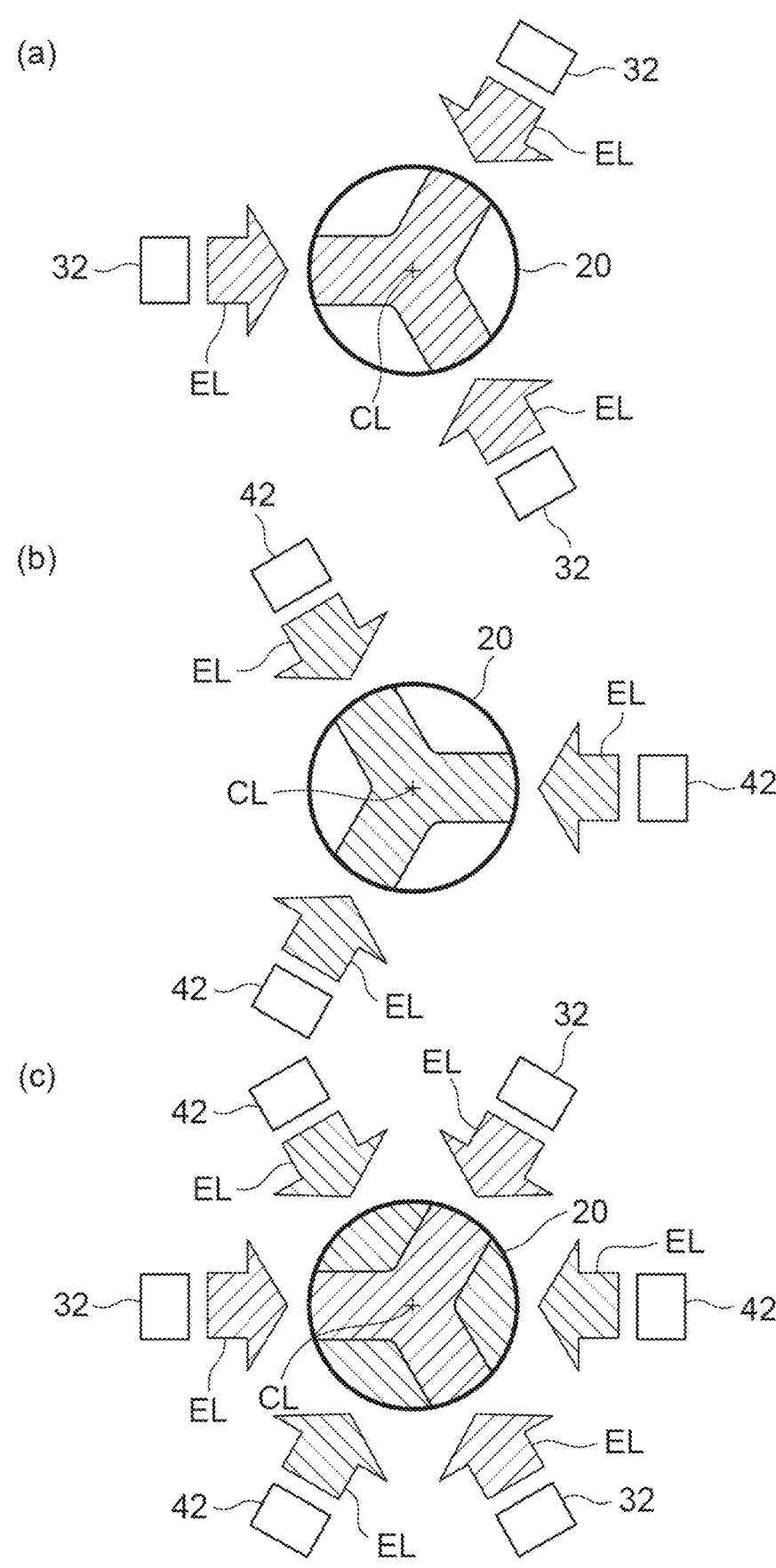
FIG. 6 shows schematic views showing excitation distributions of a laser medium in the laser device shown in FIG. 1.

As shown in (a), (b), and (c) for FIG. 6, each of the plurality of excitation light sources 32 and 42 emits excitation light EL for exciting the laser medium 20. As shown in (a) of FIG. 6, the plurality of excitation light sources 32 are disposed at equal angular pitches along a circumference centered on the center line CL. As shown in (b) of FIG. 6, the plurality of excitation light sources 42 are disposed at equal angular pitches along another circumference centered on the center line CL. When viewed in the X direction, as shown in (c) of FIG. 6, the plurality of excitation light sources 32 and 42 are disposed at equal angular pitches along the circumference centered on the center line CL. In this state, one excitation light source 32 attached to the first base 31 overlaps the second notch 45 (see FIG. 5) of the second base 41 when viewed in the X direction, and one excitation light source 42 attached to the second base 41 overlaps the first notch 35 (see FIG. 4) of the first base 31 when viewed in the X direction.

In the present embodiment, three excitation light sources 32 are disposed at a pitch of 120° along a circumference centered on the center line CL, and three excitation light sources 42 are disposed at a pitch of 120° along another circle centered on the center line CL. When viewed in the X direction, six excitation light sources 32 and 42 are disposed at a pitch of 60° along the circumference centered on the center line CL. Accordingly, a uniform excitation distribution is given to the laser medium 20 by the excitation light EL emitted from each of the excitation light sources 32 and 34.

As shown in FIG. 4, each excitation light source 32 includes a semiconductor laser element 33. The semiconductor laser element 33 emits excitation light EL toward the laser medium 20. The semiconductor laser element 33 includes a plurality of semiconductor laser bars 33a and a heat sink 33b. The plurality of semiconductor laser bars 33a are stacked such that emission end surfaces of the semiconductor laser bars 33a are arranged two-dimensionally in a plane perpendicular to a direction in which the semiconductor laser element 33 and the laser medium 20 face each other. The heat sink 33b is attached to the attachment portion 31a in a state where it supports the plurality of semiconductor laser bars 33a. The heat sink 33b is provided with an inlet 34a for introducing a coolant and an outlet 34b for leading out the coolant.

As shown in FIG. 5, each excitation light source 42 includes a semiconductor laser element 43. The semiconductor laser element 43 emits excitation light EL toward the laser medium 20. The semiconductor laser element 43 includes a plurality of semiconductor laser bars 43*a* and a heat sink 43*b*. The plurality of semiconductor laser bars 43*a* are stacked such that emission end surfaces of the semiconductor laser bars 43*a* are arranged two-dimensionally in a plane perpendicular to a direction in which the semiconductor laser element 43 and the laser medium 20 face each other. The heat sink 43*b* is attached to the attachment portion 41*a* in a state where it supports the plurality of semiconductor laser bars 43*a*. The heat sink 43*b* is provided with an inlet 44*a* for introducing a coolant and an outlet 44*b* for leading out the coolant.

As shown in FIGS. 1, 2, and 3, the holder 50 includes a first holding member 51, a second holding member 52, a connecting member 53, a leg member 54, a tubular body 55, and a partition member 61. As an example, the holder 50 is attached to an installation section S of the laser system.

Each of the first holding member 51 and the second holding member 52 is a plate-shaped member whose thickness direction is the X direction. The first holding member 51 and the second holding member 52 are arranged side by side in the X direction at a predetermined interval. The first holding member 51 holds one end portion of the laser medium 20 in the X direction in a state where one end surface 20*a* of the laser medium 20 in the X direction is exposed. The second holding member 52 holds the other end portion of the laser medium 20 in the X direction in a state where the other end surface 20*a* of the laser medium 20 in the X direction is exposed. The first light source unit 30 and the second light source unit 40 are disposed between the first holding member 51 and the second holding member 52. A shape of each of the first holding member 51 and the second holding member 52 is, for example, a rectangular plate shape. A material of each of the first holding member 51 and the second holding member 52 is, for example, aluminum. The first light source unit 30 and the second light source unit 40 are positioned inside outer edges of the first holding member 51 and the second holding member 52 (that is, do not protrude outward from the outer edges) when viewed in the X direction. As a result, even if an impact is applied to the laser device 1 in the X direction, the first light source unit 30 and the second light source unit 40 can be reliably protected.

The connecting member 53 is a plate-shaped member whose thickness direction is the Z direction. The connecting member 53 connects the first holding member 51 and the second holding member 52 to each other. In the present embodiment, the connecting member 53 spans between an end portion of the first holding member 51 on a side of the installation section S and an end portion of the second holding member 52 on a side of the installation portion S. A shape of the connecting member 53 is, for example, a rectangular plate shape. A material of the connecting member 53 is, for example, aluminum.

The leg member 54 is a plate-shaped member whose thickness direction is the Z direction. The first holding member 51, the second holding member 52, and the connecting member 53 are fixed on the leg member 54. Both end portions of the leg member 54 in the X direction are positioned outside the end portion of the first holding member 51 on a side of the installation section S and the end portion of the second holding member 52 on a side of the installation section S. Both end portions of the leg member 54 in the X direction each have a plurality of elongated holes 54*a* whose longitudinal direction is the Y direction. As an example, the holder 50 is fixed to the installation section S by a plurality of bolts (not shown) being fastened to the installation section S through the plurality of elongated holes 54*a*.

As shown in FIG. 3, the tubular body 55 is a tube-shaped member extending in the X direction. The tubular body 55 spans between the first holding member 51 and the second holding member 52 in a state where the laser medium 20 is disposed inside the tubular body 55. The tubular body 55 has optical transmittance (transmittance with respect to the excitation light EL emitted from each of the excitation light sources 32 and 42). A shape of the tubular body 55 is, for example, a cylindrical shape. A material of the tubular body 55 is, for example, synthetic quartz.

The partition member 61 is attached to the connecting member 53 between the first holding member 51 and the second holding member 52. The partition member 61 has a notch through which the laser medium 20 and the tubular body 55 pass. The first light source unit 30 is disposed between the first holding member 51 and the partition member 61. The second light source unit 40 is disposed between the second holding member 52 and the partition member 61. A material of the partition member 61 is an insulation material such as Teflon (registered trademark). A thickness of the partition member 61 in the X direction is smaller than a thickness of each of the first base 31 and the second base 41, and the thickness of each of the first base 31 and the second base 41 is smaller than a thickness of each of the first holding member 51 and the second holding member 52. By making each of the partition member 61, the first base 31, and the second base 41 thinner than each of the first holding member 51 and the second holding member 52, a portion of the laser medium 20 which the excitation light EL does not reach (a dead space) can be minimized to improve the excitation efficiency, and the overall size of the laser device 1 can be reduced. In addition, by making each of the first holding member 51 and the second holding member 52 thicker than each of the partition member 61, the first base 31, and the second base 41, the laser medium 20, the first light source unit 30, and the second light source unit 40 can be reliably held.

As shown in FIG. 4, the first holding member 51 includes a first protrusion (a first regulating part) 57. The first protrusion 57 protrudes toward the second holding member 52 from a surface 51*b* of the first holding member 51 on a side of the second holding member 52 (see FIG. 3). A shape of the first protrusion 57 is, for example, a cylindrical shape centered on the center line CL. The laser medium 20 and the tubular body 55 pass through the first protrusion 57. A side surface of the first protrusion 57 is a support surface 57*a* supporting the first base 31 rotatably in a circumferential direction centered on the center line CL. The first protrusion 57 is disposed in the first notch 35 of the first base 31, and the support surface 57*a* is in contact with a side surface 35*a* of the first notch 35. A shape of the side surface 35*a* is, for example, a shape having a complementary relationship with a half area of the support surface 57*a*. The first notch 35 extends in a straight linear shape from both end portions of the side surface 35*a* to an outer edge of the first base 31.

The partition member 61 has a groove 62. The groove 62 is formed in a surface of the partition member 61 on a side of the first holding member 51 (see FIG. 3). One end of the groove 62 is open on a side opposite to the connecting member 53 in the Z direction. The attachment portion 31*a*, of which a tip end is disposed in the groove 62, among the plurality of attachment portions 31*a* of the first base 31 is in contact with a stopper surface (a first stopper, a first regulating part) 62*a* which is one side surface of side surfaces of the groove 62 in the Y direction. The stopper surface 62a restricts rotation of the first base 31 in the circumferential direction centered on the center line CL (a counterclockwise rotation in FIG. 4).

A position of the first base 31 in the X direction, the Y direction, and the Z direction with respect to the holder 50 (furthermore, with respect to the laser medium 20) is regulated by fitting the first protrusion 57 into the first notch 35 of the first base 31, bringing the support surface 57a of the first protrusion 57 into contact with the side surface 35a of the first notch 35, and bringing the attachment portion 31a into contact with the stopper surface 62a of the partition member 61. In this state, the first base 31 is fixed to the first holding member 51 with bolts (not shown) or the like.

As shown in FIG. 5, the second holding member 52 includes a second protrusion (a second regulating part) 58. The second protrusion 58 protrudes toward the first holding member 51 from a surface 52b of the second holding member 52 on a side of the first holding member 51 (see FIG. 3). A shape of the second protrusion 58 is, for example, a cylindrical shape centered on the center line CL. The laser medium 20 and the tubular body 55 pass through the second protrusion 58. A side surface of the second protrusion 58 is a support surface 58a supporting the second base 41 rotatably in the circumferential direction centered on the center line CL. The second protrusion 58 is disposed in the second notch 45 of the second base 41, and the support surface 58a is in contact with a side surface 45a of the second notch 45. A shape of the side surface 45a is, for example, a shape having a complementary relationship with a half area of the support surface 58a. The second notch 45 extends in a straight linear shape from both end portions of the side surface 45a to an outer edge of the second base 41.

The partition member 61 has a groove 63. The groove 63 is formed in a surface of the partition member 61 on a side of the second holding member 52 (see FIG. 3). One end of the groove 63 is open on a side opposite to the connecting member 53 in the Z direction. The attachment portion 41a, of which a tip end is disposed in the groove 63, among the plurality of attachment portions 41a of the second base 41 is in contact with a stopper surface (a second stopper, a second regulating part) 63a which is the other side surface of side surfaces of the groove 63 in the Y direction. The stopper surface 63a restricts rotation of the second base 41 in the circumferential direction centered on the center line CL (a counterclockwise rotation in FIG. 5).

A position of the second base 41 in the X direction, the Y direction, and the Z direction with respect to the holder 50 (furthermore, with respect to the laser medium 20) is regulated by fitting the second protrusion 58 into the second notch 45 of the second base 41, bringing the support surface 58a of the second protrusion 58 into contact with the side surface 45a of the second notch 45, and bringing the attachment portion 41a into contact with the stopper surface 63a of the partition member 61. In this state, the second base 41 is fixed to the second holding member 52 with bolts (not shown) or the like.

Figure 7:
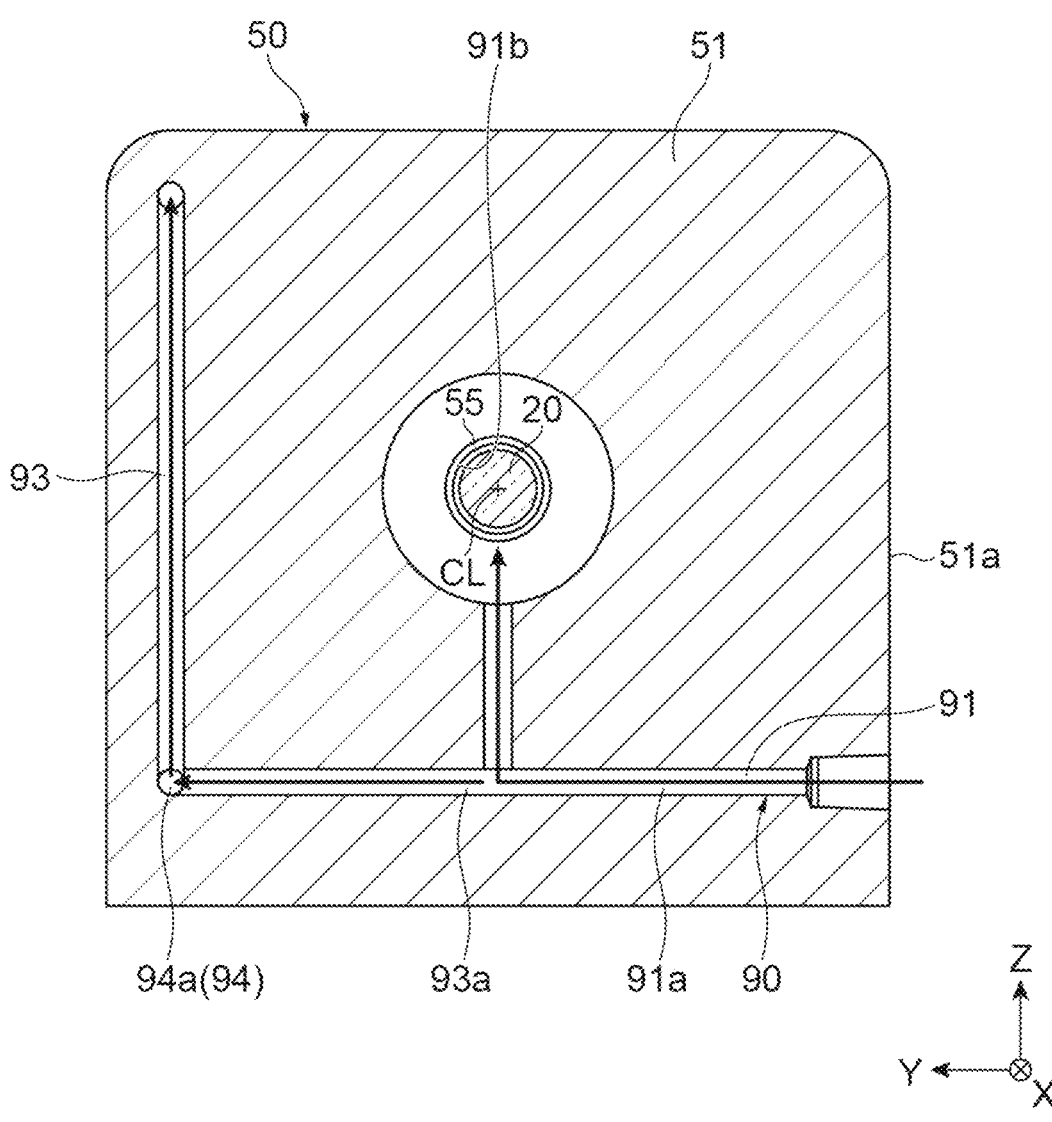
FIG. 7 is a cross-sectional view of the laser device along line VII-VII shown in FIG. 3.
Figure 8:
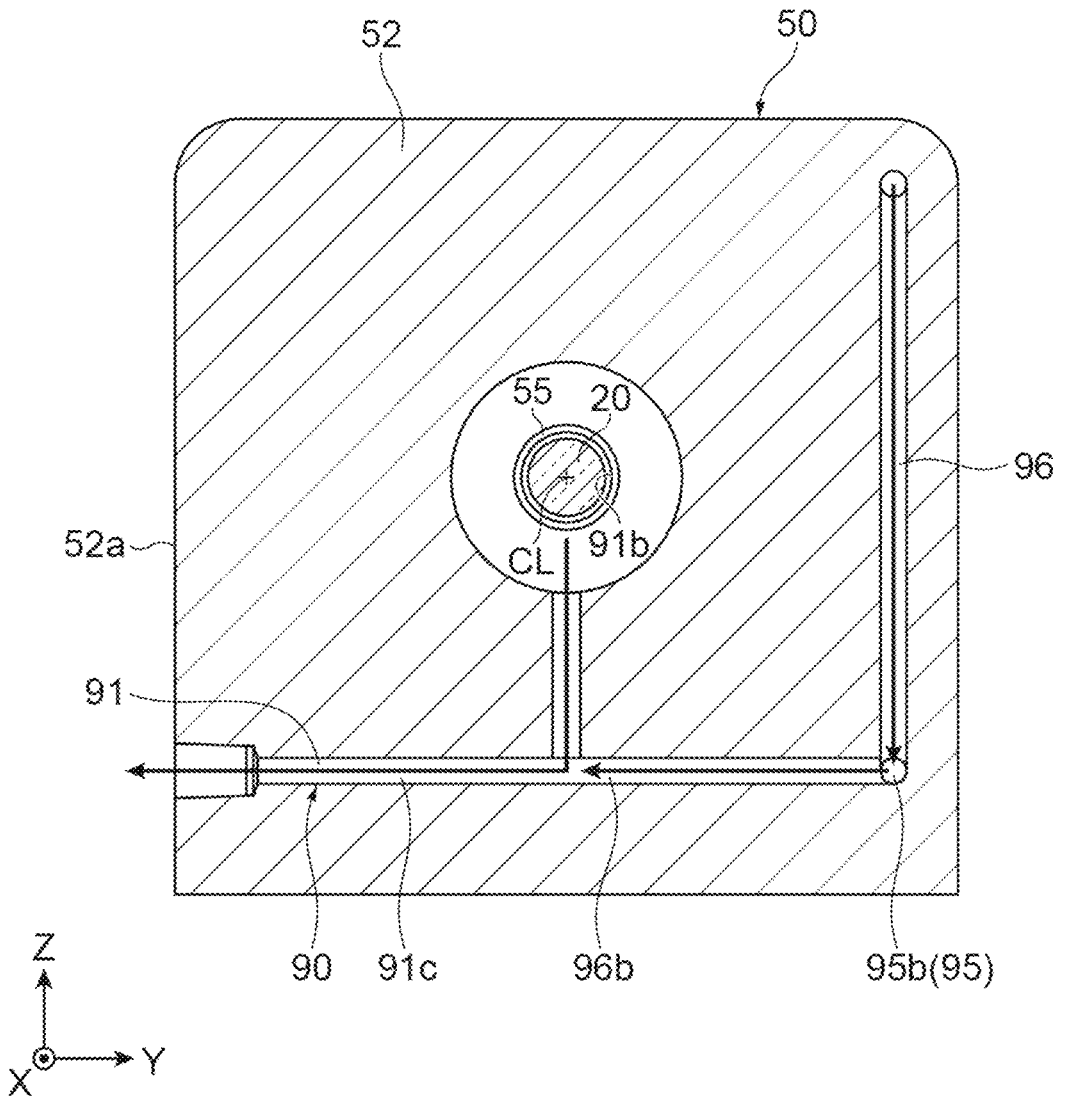
FIG. 8 is a cross-sectional view of the laser device along line VIII-VIII shown in FIG. 3.

As shown in FIGS. 7 and 8, the holder 50 includes a third flow path 90. As shown in FIG. 4, the first base 31 includes a first flow path 70. As shown in FIG. 5, the second base 41 includes a second flow path 80. A coolant flows through the first flow path 70, the second flow path 80, and the third flow path 90. The coolant is, for example, water. The first flow path 70, the second flow path 80, and the third flow path 90 communicate with each other. That is, the first flow path 70, the second flow path 80, and the third flow path 90 are connected to each other such that the coolant supplied from a common supply source (not shown) flows therethrough.

As shown in FIGS. 7 and 8, the third flow path 90 includes a main flow path 91. The main flow path 91 includes a plurality of flow path portions 91a, 91b, and 91c. The flow path portion 91b is a flow path between the laser medium 20 and the tubular body 55.

The flow path portion 91a is formed in the first holding member 51. An upstream end of the flow path portion 91a is positioned on a side surface 51a of the first holding member 51. The upstream end of the flow path portion 91a is a coolant supply port 90a (see FIG. 4). A downstream end of the flow path portion 91a is connected to an upstream end of the flow path portion 91b. The flow path portion 91c is formed in the second holding member 52. An upstream end of the flow path portion 91c is connected to a downstream end of the flow path portion 91b. A downstream end of the flow path portion 91c is positioned on a side surface 52a of the second holding member 52. The downstream end of the flow path portion 91c is a coolant discharge port 90b (see FIG. 5). Since the side surface 51a of the first holding member 51 and the side surface 52a of the second holding member 52 are on the same side in the Y direction, it is easy to handle an external pipe.

In the main flow path 91 configured as described above, the coolant is supplied from the upstream end of the flow path portion 91a, the coolant flows through the flow path portions 91a, 91b, and 91c in order, and the coolant is discharged from the downstream end of the flow path portion 91c. As a result, the laser medium 20 is cooled.

As shown in FIG. 7, the third flow path 90 further includes a first branch flow path 93 and a second branch flow path 94. The first branch flow path 93 and the second branch flow path 94 are formed in the first holding member 51. The first branch flow path 93 branches off from the main flow path 91. An upstream end 93a of the first branch flow path 93 is connected to the middle of the flow path portion 91a of the main flow path 91 (a portion of the main flow path 91 on an upstream side of the flow path portion 91b). As shown in FIG. 4, a downstream end 93b of the first branch flow path 93 is positioned on the surface 51b of the first holding member 51. As shown in FIG. 7, the second branch flow path 94 branches off from the main flow path 91. An upstream end 94a of the second branch flow path 94 is connected to the middle of the flow path portion 91a of the main flow path 91 via a part of the first branch flow path 93. As shown in FIG. 4, a downstream end 94b of the second branch flow path 94 is positioned on the surface 51b of the first holding member 51.

As shown in FIG. 8, the third flow path 90 further includes a third branch flow path 95 and a fourth branch flow path 96. The third branch flow path 95 and the fourth branch flow path 96 are formed in the second holding member 52. The third branch flow path 95 joins the main flow path 91. As shown in FIG. 5, an upstream end 95a of the third branch flow path 95 is positioned on the surface 52b of the second holding member 52. As shown in FIG. 8, a downstream end 95b of the third branch flow path 95 is connected to the middle of the flow path portion 91c of the main flow path 91 (a portion of the main flow path 91 on a downstream side of the flow path portion 91b) via a part of the fourth branch flow path 96. The fourth branch flow path 96 joins the main flow path 91. As shown in FIG. 5, an upstream end 96a of the fourth branch flow path 96 is positioned on the surface 52b of the second holding member 52. A downstream end 96b of the fourth branch flow path 96 is connected to the middle of the flow path portion 91e of the main flow path 91.

As shown in FIG. 4, an upstream end 70a of the first flow path 70 is connected to the downstream end 93b of the first branch flow path 93. As shown in FIG. 5, a downstream end 70b of the first flow path 70 is connected to the upstream end 95a of the third branch flow path 95. In the first flow path 70, with respect to the excitation light sources 32 adjacent along the circumference centered on the center line CL, the outlet 34b of the excitation light source 32 on an upstream side and the inlet 34a of the excitation light source 32 on a downstream side are connected to each other by a flexible pipe 71 (see FIG. 2). Further, in the first flow path 70, the downstream end 93b of the first branch flow path 93 and the inlet 34a of the excitation light source 32 on the most upstream side are connected to each other by the pipe 71, and the outlet 34b of the excitation light source 32 on the most downstream side and the upstream end 95a of the third branch flow path 95 are connected to each other by the pipe 71. In FIGS. 3, 4, and 5, illustration of the pipe 71 is omitted.

In the first branch flow path 93, the first flow path 70, and the third branch flow path 95 configured as described above, the coolant is supplied from the main flow path 91 at the upstream end 93a of the first branch flow path 93, the coolant flows through the first branched flow path 93, the first flow path 70, and the third branched flow path 95 in that order, and the coolant at the downstream end 95b of the third branched flow path 95 joins that of the main flow path 91. As a result, in the semiconductor laser element 33 of each excitation light source 32, the plurality of semiconductor laser bars 33a are cooled.

As shown in FIG. 4, an upstream end 80a of the second flow path 80 is connected to the downstream end 94b of the second branch flow path 94. As shown in FIG. 5, a downstream end 80b of the second flow path 80 is connected to the upstream end 96a of the fourth branch flow path 96. In the second flow path 80, with respect to the excitation light sources 42 adjacent along the circumference centered on the center line CL, the outlet 44b of the excitation light source 42 on an upstream side and the inlet 44a of the excitation light source 42 on a downstream side are connected to each other by a flexible pipe 81 (see FIG. 1). Further, in the second flow path 80, the downstream end 94b of the second branch flow path 94 and the inlet 44a of the excitation light source 42 on the most upstream side are connected to each other by the pipe 81, and the outlet 44b of the excitation light source 42 on the most downstream side and the upstream end 96a of the fourth branch flow path 96 are connected to each other by the pipe 81. In FIGS. 3, 4, and 5, illustration of the pipe 81 is omitted.

In the second branch flow path 94, the second flow path 80, and the fourth branch flow path 96 configured as described above, the coolant is supplied from the main flow path 91 at the upstream end 94a of the second branch flow path 94, the coolant flows through the second branched flow path 94, the second flow path 80, and the fourth branched flow path 96 in that order, and the coolant at the downstream end 96b of the fourth branched flow path 96 joins that of the main flow path 91. As a result, in the semiconductor laser element 43 of each excitation light source 42, the plurality of semiconductor laser bars 43a are cooled.

A method for manufacturing the laser device 1 will be described. In the present embodiment, as shown in FIGS. 4 and 5, the holder 50 supporting the laser medium 20 is attached to the installation section S of the laser system. First, the first light source unit 30 is prepared (a step of preparing the first light source unit). Subsequently, as shown in FIG. 4, in the holder 50 supporting the laser medium 20, the first base 31 is disposed on the holder 50 from one side (specifically, a side opposite to the connecting member 53) in the Y direction (a second direction intersecting with the first direction) while the laser medium 20 and the tubular body 55 are passed through the first notch 35 of the first base 31 (a disposing step). Subsequently, in a state where the first protrusion 57 is fitted into the first notch 35 of the first base 31 and the support surface 57a of the first protrusion 57 is brought into contact with the side surface 35a of the first notch 35, the first base 31 is rotated to one side in the circumferential direction centered on the center line CL, and the attachment portion 31a is brought into contact with the stopper surface 62a of the partition member 61 (a step of rotating the first base). In this state, the first base 31 is fixed to the first holding member 51 with bolts (not shown) or the like.

Subsequently, the second light source unit 40 is prepared (a step of preparing the second light source unit). Subsequently, as shown in FIG. 5, in the holder 50 supporting the laser medium 20, the second base 41 is disposed on the holder 50 from one side (specifically, a side opposite to the connecting member 53) in the Y direction while the laser medium 20 and the tubular body 55 are passed through the second notch 45 of the second base 41. Subsequently, in a state where the second protrusion 58 is fitted into the second notch 45 of the second base 41 and the support surface 58a of the second protrusion 58 is brought into contact with the side surface 45a of the second notch 45, the second base 41 is rotated to the other side in the circumferential direction centered on the center line CL, and the attachment portion 41a is brought into contact with the stopper surface 63a of the partition member 61 to arrange the first light source unit 30 and the second light source unit 40 side by side in the X direction (an arranging step). In this state, the second base 41 is fixed to the second holding member 52 with bolts (not shown) or the like.

When the first base 31 is attached to the holder 50, the position of the first base 31 in the X direction, the Y direction, and the Z direction with respect to the holder 50 (furthermore, with respect to the laser medium 20) is regulated by fitting the first protrusion 57 into the first notch 35 of the first base 31, bringing the support surface 57a of the first protrusion 57 into contact with the side surface 35a of the first notch 35, and bringing the attachment portion 31a into contact with the stopper surface 62a of the partition member 61. At this time, the first base 31 is prevented from coining into contact with the tubular body 55 and damaging the tubular body 55.

When the second base 41 is attached to the holder 50, the position of the second base 41 in the X direction, the Y direction, and the Z direction with respect to the holder 50 (furthermore, with respect to the laser medium 20) is regulated by fitting the second protrusion 58 into the second notch 45 of the second base 41, bringing the support surface 58a of the second protrusion 58 into contact with the side surface 45a of the second notch 45, and bringing the attachment portion 41a into contact with the stopper surface 63a of the partition member 61. At this time, the second base 41 is prevented from coining into contact with the tubular body 55 and damaging the tubular body 55.

As described above, in the laser device 1, the first base 31 and the plurality of excitation light sources 32 are unitized as the first light source unit 30, and the second base 41 and the plurality of excitation light sources 42 are unitized as the second light source unit 40. The first light source unit 30 and the second light source unit 40 are supported by the holder 50 in a state where they are arranged side by side in the X direction. As a result, the plurality of excitation light sources 32 and 42 can be easily attached to and detached from the holder 50 by simply attaching and detaching each of the first base 31 and the second base 41 to and from the holder 50. Furthermore, when the first base 31 is attached to the holder 50 supporting the laser medium 20, the laser medium 20 passes through the first notch 35 of the first base 31, and the position of the first base 31 with respect to the holder 50 is regulated by the first protrusion 57 of the first holding member 51 and the stopper surface 62a of the partition member 61. Similarly, when the second base 41 is attached to the holder 50 supporting the laser medium 20, the laser medium 20 passes through the second notch 45 of the second base 41, and the position of the second base 41 with respect to the holder 50 is regulated by the second protrusion 58 of the second holding member 52 and the stopper surface 63a of the partition member 61. As a result, the plurality of excitation light sources 32 and 42 can be easily positioned with respect to the laser medium 20 by simply attaching each of the first base 31 and the second base 41 to the holder 50 supporting the laser medium 20. As described above, according to the laser device 1, it is possible to facilitate the attachment and detachment of the plurality of excitation light sources 32 and 42 and to facilitate the positioning of the plurality of excitation light sources 32 and 42.

In the laser device 1, the holder 50 includes the first holding member 51 and the second holding member 52 arranged side by side in the X direction and the connecting member 53 connecting the first holding member 51 and the second holding member 52 to each other, and the first light source unit 30 and the second light source unit 40 are disposed between the first holding member 51 and the second holding member 52. As a result, the size of the laser device 1 can be reduced and the structure can be simplified.

In the laser device 1, the first holding member 51 includes the first protrusion 57 disposed in the first notch 35 of the first base 31, and the first protrusion 57 has the support surface 57a supporting the first base 31 rotatably in the circumferential direction centered on the center line CL. As a result, the positions of the plurality of excitation light sources 32 of the first light source unit 30 can be adjusted in the circumferential direction centered on the center line CL.

In the laser device 1, the second holding member 52 includes the second protrusion 58 disposed in the second notch 45 of the second base 41, and the second protrusion 58 has the support surface 58a supporting the second base 41 rotatably in the circumferential direction centered on the center line CL. As a result, the positions of the plurality of excitation light sources 42 of the second light source unit 40 can be adjusted in the circumferential direction centered on the center line CL.

In the laser device 1, the partition member 61 of the holder 50 has the stopper surface 62a configured to restrict the rotation of the first base 31 in the circumferential direction centered on the center line CL and the stopper surface 63a configured to restrict the rotation of the second base 41 in the circumferential direction centered on the center line CL. As a result, the plurality of excitation light sources 32 and 42 can be easily and reliably positioned with respect to the laser medium 20 by bringing the first base 31 into contact with the stopper surface 62a of the partition member 61 and bringing the second base 41 into contact with the stopper surface 63a of the partition member 61.

In the laser device 1, the partition member 61 is made of an insulation material. As a result, it is possible to reliably prevent short circuits between the plurality of excitation light sources 32 of the first light source unit 30 and the plurality of excitation light sources 42 of the second light source unit 40.

In the laser device, one excitation light source 32 attached to the first base 31 overlaps the second notch 45 of the second base 41 when viewed in the X direction, and one excitation light source 42 attached to the second base 41 overlaps the first notch 35 of the first base 31 when viewed in the X direction. As a result, an excitation distribution in the laser medium 20 can be made uniform.

In the laser device 1, the first base 31 includes the first flow path 70 through which the coolant flows, the second base 41 includes the second flow path 80 through which the coolant flows, and the holder 50 includes the third flow path 90 through which the coolant flows. As a result, the laser medium 20 and the plurality of excitation light sources 32 and 42 can be cooled.

In the laser device 1, the first flow path 70, the second flow path 80, and the third flow path 90 communicate with each other. As a result, the laser medium 20 and the plurality of excitation light sources 32 and 42 can be efficiently cooled.

In the laser device 1, the third flow path 90 includes the main flow path 91 including the flow path portion 91b between the laser medium 20 and the tubular body 55, the first branch flow path 93 and the second branch flow path 94 branching from the main flow path 91, and the third branch flow path 95 and the fourth branch flow path 96 joining the main flow path 91. In the laser device 1, the downstream end 93b of the first branch flow path 93 is connected to the upstream end 70a of the first flow path 70, the downstream end 94b of the second branch flow path 94 is connected to the upstream end 80a of the second flow path 80, the upstream end 95a of the third branch flow path 95 is connected to the downstream end 70b of the first flow path 70, and the upstream end 96a of the fourth branch flow path 96 is connected to the downstream end 80b of the second flow path 80. As a result, the laser medium 20 and the plurality of excitation light sources 32 and 42 can be efficiently cooled with a simple flow path configuration.

In the laser device 1, each excitation light source 32 includes the semiconductor laser element 33, and each excitation light source 42 includes the semiconductor laser element 43. As a result, the lifetime of each of the excitation light sources 32 and 42 can be extended. In addition, since the plurality of excitation light sources 32 are unitized as the first light source unit 30, and the plurality of excitation light sources 42 are unitized as the second light source unit 40, delicacy required for handling an individual item of the semiconductor laser element is not necessary.

In the laser device 1, the semiconductor laser element 33 includes the plurality of stacked semiconductor laser bars 33a, and the semiconductor laser element 43 includes the plurality of stacked semiconductor laser bars 43a. As a result, the laser medium 20 can be efficiently and sufficiently excited.

In the method for manufacturing the laser device 1, the plurality of excitation light sources 32 of the first light source unit 30 can be easily positioned with respect to the laser medium 20 by simply disposing the first base 31 on the holder 50 from one side in the Y direction while the laser medium 20 is passed through the first notch 35 of the first base 31 and rotating the first base 31 in the circumferential direction centered on the center line CL. The plurality of excitation light sources 42 of the second light source unit 40 can be easily positioned with respect to the laser medium 20 by simply disposing the second base 41 on the holder 50 from one side in the Y direction while the laser medium 20 is passed through the second notch 45 of the second base 41 and rotating the first base 31 in the circumferential direction centered on the center line CL. Therefore, according to the method for manufacturing the laser device 1, the laser device 1 in which the plurality of excitation light sources 32 are positioned with respect to the laser medium 20 can be easily obtained. The present disclosure is not limited to the above embodiment. For example, the first light source unit 30 includes three excitation light sources 32 in the above embodiment, but the first light source unit 30 only has to include a plurality of excitation light sources 32. Similarly, the second light source unit 40 includes three excitation light sources 42 in the above embodiment, but the second light source unit 40 only has to include a plurality of excitation light sources 42.

In the above embodiment, both the first base 31 and the second base 41 are rotatable in the circumferential direction centered on the center line CL, but at least one of the first base 31 and the second base 41 may be rotatable in the circumferential direction centered on the center line CL.

Figure 9:
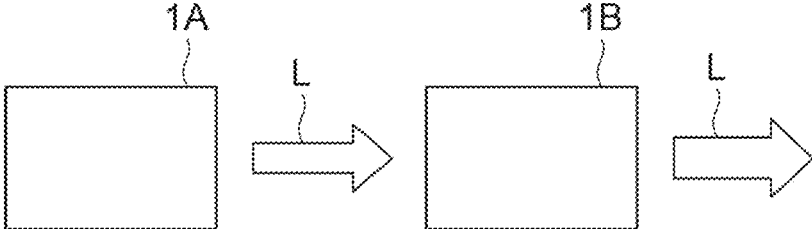
FIG. 9 is a configuration diagram of a laser system including a laser device of a modification example.

The laser device 1 may include at least one of the first light source unit 30 and the second light source unit 40. In this case, as shown in FIG. 9, by disposing a laser device 1A including the first light source unit 30 and a laser device 1B including the second light source unit 40 on the same optical axis, the plurality of excitation light sources 32 and 42 of the first light source unit 30 and the second light source unit 40 are disposed at equal angular pitches centered on the optical axis when viewed in direction parallel to the optical axis, and thus it is possible to excite the laser light L uniformly. According to this configuration, for example, compared to the case where one laser medium is irradiated with excitation light from a large number of excitation light sources, an irradiation area of the excitation light EL with respect to each laser medium 20 can be curbed, and degradation of each laser medium 20 due to the thermal lens effect can be prevented.

The first flow path 70 may include a flow path formed in a main body of the first base 31 to which the plurality of excitation light sources 32 are attached. Similarly, the second flow path 80 may include a flow path formed in a main body of the second base 41 to which the plurality of excitation light sources 42 are attached.

The heat sink 33b of the semiconductor laser element 33 may release heat to the first base 31 without including the flow path through the coolant flows. Similarly, the heat sink 43b of the semiconductor laser element 43 may release heat to the second base 41 without including the flow path through the coolant flows.

The first base 31 and the second base 41 may not include the first flow path 70 and the second flow path 80, respectively. In this case, each of the first base 31 and the second base 41 may be provided with radiation fins. The semiconductor laser elements 33 and 43 are cooled by the first base 31 and the second base 41 being cooled by air cooling or natural heat radiation.

Each excitation light source 32 may include an electronic cooling element for cooling the semiconductor laser element 33. Similarly, each excitation light source 42 may include an electronic cooling element for cooling the semiconductor laser element 43.

In the above embodiment, the holder 50 includes the first protrusion 57 of the first holding member 51 and the stopper surface 62a of the partition member 61 as the first regulating part configured to regulate the position of the first base 31 with respect to the holder 50, but the first base 31 may include the first regulating part, and both the first base 31 and the holder 50 may each include the first regulating part. That is, at least one of the first base 31 and the holder 50 only has to include the first regulating part configured to regulate the position of the first base 31 with respect to the holder 50. The first regulating part may be a positioning pin and a positioning hole, a positioning bolt and a positioning screw hole (in this case, they also serve to fix the first base 31 to the holder 50), or the like.

In the above embodiment, the holder 50 includes the second protrusion 58 of the second holding member 52 and the stopper surface 63a of the partition member 61 as the second regulating part configured to regulate the position of the second base 41 with respect to the holder 50, but the second base 41 may include the second regulating part, and both the second base 41 and the holder 50 may each include the second regulating part. That is, at least one of the second base 41 and the holder 50 only has to include the second regulating part configured to regulate the position of the second base 41 with respect to the holder 50. The second regulating part may be a positioning pin and a positioning hole, a positioning bolt and a positioning screw hole (in this case, they also serve to fix the second base 41 to the holder 50), or the like.

In the above embodiment, the holder 50 includes the first protrusion 57 of the first holding member 51 and the stopper surface 62a of the partition member 61 as the first regulating part configured to regulate the position of the first base 31 with respect to the holder 50, and the holder 50 includes the second protrusion 58 of the second holding member 52 and the stopper surface 63a of the partition member 61 as the second regulating part configured to regulate the position of the second base 41 with respect to the holder 50, but at least one of the first base 31 and the holder 50 may include the first regulating part configured to regulate the position of the first base 31 with respect to the holder 50, and at least one of the first base 31 and the second base 41 may include the second regulating part configured to regulate the position of the second base 41 with respect to the first base 31. In this case, the plurality of excitation light sources 32 and 42 can be easily attached to and detached from the holder 50 by simply attaching and detaching each of the first base 31 and the second base 41 to and from the holder 50. Furthermore, the plurality of excitation light sources 32 and 42 can be easily positioned with respect to the laser medium 20 by simply attaching each of the first base 31 and the second base 41 to the holder 50 supporting the laser medium 20.

As long as the holder 50 is configured to support the laser medium 20 and the first light source unit 30 (when the second light source unit 40 is included, the laser medium 20, the first light source unit 30, and the second light source unit 40), the holder 50 may not include the connecting member 53, or may not include either one of the first holding member 51 and the second holding member regardless of whether or not the connecting member 53 is included, for example. In the case in which the holder 50 is configured to support the laser medium 20 and the first light source unit 30 (when the second light source unit 40 is included, the laser medium 20, the first light source unit 30, and the second light source unit 40), it is not essential that each of the laser medium 20 and the first light source unit 30 (when the second light source unit 40 is included, the laser medium 20, the first light source unit 30, and the second light source unit 40) is in contact with the holder 50. For example, the first light source unit 30 may be supported by the holder 50 in a state in which the first light source unit 30 is in contact with the holder 50, and the second light source unit 40 may be supported by the holder 50 in a state in which the second light source unit 40 is in contact with the first light source unit and is spaced apart from the holder 50.

REFERENCE SIGNS LIST

1 Laser device
20 Laser medium
30 First light source unit
31 First base
32 Excitation light source
33 Semiconductor laser element
33*a* Semiconductor laser bar
35 First notch
40 Second light source unit
41 Second base
42 Excitation light source
43 Semiconductor laser element
43*a* Semiconductor laser bar
45 Second notch
50 Holder
51 First holding member
52 Second holding member
53 Connecting member
55 Tubular body
57 First protrusion (first regulating part)
57*a* Support surface
58 second protrusion (second regulating part)
58*a* Support surface
61 Partition member
62*a* Stopper surface (first stopper, first regulating part)
63*a* Stopper surface (second stopper, second regulating part)
55 Tubular body
70 First flow path
70*a* Upstream end
70*b* Downstream end
80 Second flow path
80*a* Upstream end
80*b* Downstream end
90 Third flow path
91 Main flow path
91*b* Flow path portion (flow path)
93 First branch flow path
93*b* Downstream end
94 Second branch flow path
94*b* Downstream end
95 Third branch flow path
95*a* Upstream end
96 Fourth branch flow path
96*a* Upstream end

The invention claimed is:

1. A laser device comprising:
a rod-shaped laser medium extending in a first direction;
a first light source unit including a first base having a first notch through which the laser medium passes and a plurality of excitation light sources attached to the first base;
a second light source unit arranged side by side with the first light source unit in the first direction, the second light source unit including a second base having a second notch through which the laser medium passes and a plurality of excitation light sources attached to the second base; and
a holder supporting the laser medium, the first light source unit, and the second light source unit, wherein the first light source unit and the second light source unit are each fixed to the holder,
wherein at least one of the first base and the holder includes a first regulating part configured to regulate a position of the first base with respect to the holder,
wherein at least one of the second base and the holder includes a second regulating part configured to regulate a position of the second base with respect to the holder,
wherein the holder includes a first holding member and a second holding member arranged side by side in the first direction, a connecting member connecting the first holding member and the second holding member to each other, and a partition member attached to the connecting member between the first holding member and the second holding member,
wherein the first light source unit is disposed between the first holding member and the partition member, and the second light source unit is disposed between the second holding member and the partition member,
wherein the partition member includes a first stopper as the first regulating part and includes a second stopper as the second regulating part,
wherein the first stopper is configured to restrict rotation of the first base in a circumferential direction centered on a center line of the laser medium in a case where the first light source unit is not fixed to the holder, and
wherein the second stopper is configured to restrict rotation of the second base in the circumferential direction in a case where the second light source unit is not fixed to the holder.

2. The laser device according to claim 1,
wherein the first holding member includes a first protrusion disposed in the first notch as the first regulating part, and
wherein the first protrusion has a support surface supporting the first base rotatably in the circumferential direction.

3. The laser device according to claim 2,
wherein the second holding member includes a second protrusion disposed in the second notch as the second regulating part, and
wherein the second protrusion has a support surface supporting the second base rotatably in the circumferential direction.

4. The laser device according to claim 1, wherein the partition member is made of an insulation material.

5. The laser device according to claim 1,
wherein at least one of the plurality of excitation light sources attached to the first base overlaps the second notch when viewed in the first direction, and
wherein at least one of the plurality of excitation light sources attached to the second base overlaps the first notch when viewed in the first direction.

6. The laser device according to claim 1,
wherein the first base includes a first flow path through which a coolant flows,
wherein the second base includes a second flow path through which a coolant flows, and
wherein the holder includes a third flow path through which a coolant flows.

7. The laser device according to claim 6, wherein the first flow path, the second flow path, and the third flow path communicate with each other.

8. The laser device according to claim 7,
wherein the holder includes a tubular body in which the laser medium is disposed,
wherein the tubular body has light transmittance, wherein the third flow path includes a main flow path including a flow path between the laser medium and the tubular body, a first branch flow path and a second branch flow path branching from the main flow path, and a third branch flow path and a fourth branch flow 5 path which joining the main flow path, wherein a downstream end of the first branch flow path is connected to an upstream end of the first flow path, wherein a downstream end of the second branch flow path is connected to an upstream end of the second flow 10 path, wherein an upstream end of the third branch flow path is connected to the downstream end of the first flow path, and wherein an upstream end of the fourth branch flow path is 15 connected to the downstream end of the second flow path.

9. The laser device according to claim 1, wherein each of the plurality of excitation light sources includes a semiconductor laser element. 20

10. The laser device according to claim 9, wherein the semiconductor laser element includes a plurality of stacked semiconductor laser bars.

11. A method for manufacturing a laser device, comprising: 25 a step of preparing a holder supporting a rod-shaped laser medium extending in a first direction, the holder including a first holding member and a second holding member arranged side by side in the first direction, a connecting member connecting the first holding member and the second holding member to each other, and a partition member attached to the connecting member between the first holding member and the second holding member and provided with a first stopper and a second stopper, a step of preparing a first light source unit including a first base having a first notch and a plurality of excitation light sources attached to the first base, and a second light source unit including a second base having a second notch and a plurality of excitation light sources attached to the second base;

a step of disposing the first base on the holder from one side in a second direction intersecting with the first direction while the laser medium is passed through the first notch between the first holding member and the partition member;

rotating the first base to one side in a circumferential direction centered on a center line of the laser medium until rotation thereof is restricted by the first stopper, and fixing the first light source unit to the holder; and a step of disposing the second base on the holder from the one side in the second direction while the laser medium is passed through the second notch between the second holding member and the partition member, and rotating the second base to the other side in the circumferential direction until rotation thereof is restricted by the second stopper, and fixing the second light source unit to the holder.

* * * * *